(12) United States Patent
Nicosia (10) Patent No.: US 9,307,399 B2
(45) Date of Patent: Apr. 5, 2016

(54) SYSTEM FOR CONNECTING TO WIRELESS LOCAL AREA NETWORKS WHILE IN MOTION TO SEND AND RECEIVE GPS DATA AND OTHER INFORMATION TO A WEB PORTAL OR SOFTWARE APPLICATION

(71) Applicant: MagicGPS, LLC, Phoenix, AZ (US)

(72) Inventor: Vincent Nicosia, Phoenix, AZ (US)

(73) Assignee: MagicGPS, LLC, Phoenix, AZ (US)

( * ) Notice: Subject to any disclaimer, the term of this patent is extended or adjusted under 35 U.S.C. 154(b) by 227 days.

(21) Appl. No.: 14/226,317

(22) Filed: Mar. 26, 2014

(65) Prior Publication Data

US 2014/0204934 A1   Jul. 24, 2014

Related U.S. Application Data

(63) Continuation-in-part of application No. 13/678,852, filed on Nov. 16, 2012, now abandoned.

(51) Int. Cl.
| | |
|---|---|
| *H04W 8/24* | (2009.01) |
| *H04W 4/02* | (2009.01) |
| *H04W 4/20* | (2009.01) |
| *H04W 48/16* | (2009.01) |

(52) U.S. Cl.
CPC .............. *H04W 8/245* (2013.01); *H04W 4/027* (2013.01); *H04W 4/20* (2013.01); *H04W 48/16* (2013.01)

(58) Field of Classification Search
CPC ........ H04W 8/245; H04W 4/027; H04W 48/16
See application file for complete search history.

(56) References Cited

U.S. PATENT DOCUMENTS

| | | | | |
|---|---|---|---|---|
| 6,208,861 | B1 * | 3/2001 | Suzuki ................. | H04W 48/16 455/428 |
| 2006/0227972 | A1 | 10/2006 | Brok et al. | |
| 2009/0131081 | A1 * | 5/2009 | Abdel-Kader ........ | H04W 48/16 455/456.6 |
| 2011/0171909 | A1 * | 7/2011 | Jung ..................... | H04W 48/16 455/41.2 |
| 2011/0207553 | A1 | 8/2011 | Reid et al. | |
| 2012/0136754 | A1 | 5/2012 | Underwood | |

* cited by examiner

*Primary Examiner* — Jamal Javaid
(74) *Attorney, Agent, or Firm* — Kelly & Kelley, LLP (57) ABSTRACT

A process for detecting and connecting a GPS-enabled device to available in-range wireless local area networks (WLANs), particularly while the device is in motion. Once connected, the GPS enabled device sends and receives data and other information from a web service or software application. The process includes detecting relative movement speed of the GPS device and repeatedly attempts connections with new WLAN access points when in motion, particularly in excess of five miles per hour and/or twenty-five miles per hour.

11 Claims, 5 Drawing Sheets

SYSTEM FOR CONNECTING TO WIRELESS LOCAL AREA NETWORKS WHILE IN MOTION TO SEND AND RECEIVE GPS DATA AND OTHER INFORMATION TO A WEB PORTAL OR SOFTWARE APPLICATION

FIELD OF THE INVENTION

The present invention is directed to a method or system of searching for and connecting to a series of wireless local area networks (WLANs) on a mobile device while moving, and then using those series of wireless networks to send and receive global positioning system (GPS) data, software, information and other data to/from a web service or application. Specifically, the present invention is concerned with using such wireless networks as opposed to cellular or satellite networks.

BACKGROUND OF THE INVENTION

Present day GPS devices use cellular or satellite networks to send and receive data. Each of these GPS devices are designed or programmed specifically for a manufacturer's cellular or satellite network. Due to this restriction, they have a higher overall cost of operation. These systems do not search for and utilize available wireless local area networks, i.e., 802.11, that may be in range, particularly when moving.

Wi-Fi Access Points or Hot Spots that provide wireless local area networks are designed for generally stationary devices and do not provide reasonable and reliable accessibility for connected devices moving at a velocity that will soon take them out of range of the network. Such networks do not typically allow for devices that roam from one Wi-Fi network access point to another and maintain nearly seamless network connectivity. Current Wi-Fi networks do not take active steps to disassociate an existing Wi-Fi connection as they are designed to facilitate re-connection when a device is restarted after being turned off. This allows existing Wi-Fi networks to keep an association with a device current as opposed to expired.

In addition, Wi-Fi network access points or hot spots have to go through an authentication and negotiation process when reconnecting. Such authentication and negotiation can typically take up to 45 seconds or 1 minute. If a device is moving, it can move out of range of the Wi-Fi network access point or hot spot within seconds depending on its velocity—speed and direction. If the authentication and negotiation can take up to a minute, a device can be out of range of a Wi-Fi access point or hot spot before it is even connected.

Accordingly, there is a need for a GPS ready mobile device that is capable of searching for and utilizing wireless local area networks for the sending and receiving of GPS data and other information. The present invention fulfills these needs and provides other related advantages.

SUMMARY OF THE INVENTION

The present invention reduces the operation cost of GPS systems by leveraging 802.11 Wi-Fi networks or similar local area networks. In a first aspect, there is a process for connecting to such 802.11 Wi-Fi-networks whether moving or stationary. When moving, the process searches for available 802.11 Wi-Fi networks that are in range. Once such a network is located, the process uses a variety of steps to quickly and reliably connect to the network while it is in range. The four most common methods are described herein.

When the GPS ready device is connected to such a network, it sends GPS data and other information to a connected web service or software application. The web service or software application can return related data, software, information and/or instructions.

The present invention is directed to a process for detecting and connecting to wireless local area networks (WLANs) to exchange GPS data and information between a GPS receiver having a wireless network adapter and a master GPS server. The process begins with collecting GPS records about a current location and movement speed data using a GPS receiver. Available WLANs within range of the GPS receiver are scanned for and the GPS receiver is connected to a selected WLAN. The GPS records are sent from the GPS receiver to the master GPS network over the selected WLAN. The GPS receiver also receives information and/or software, i.e., updates, from the master GPS network over the selected WLAN.

The collecting step includes detecting whether the GPS receiver is in motion or stationary, collecting GPS records about the current location and movement speed data of the GPS receiver, and storing the collected GPS records and movement speed data in a volatile memory database contained in the GPS receiver. The collecting of the GPS records is performed in five second intervals if the GPS receiver is in motion and in ten minute intervals if the GPS receiver is stationary. The process includes checking whether a movement speed of the GPS receiver previously exceeded five miles per hour and is presently less than five miles per hour, and saving collected GPS records if the movement speed is presently less than five miles per hour; the GPS receiver loses connection with the selected WLAN, or the GPS receiver is stationary for more than thirty minutes.

The process includes locking out one sub-process in favor of another for data preservation purposes. In one sub-process, a GPS process interlock is engaged and the collected GPS records are appended to a GPS data file maintained on a non-volatile memory database. The movement speed data is saved to a speed data file maintained on the non-volatile memory database. Once both sets of data records are written, the GPS process interlock is disengaged.

In another sub-process a Link Handler process interlock is engaged. Then the GPS data file is copied to an Upload file and the Link Handler process interlock is disengaged. The Upload file is then uploaded to the master GPS server over the selected WLAN. Delivery of the Upload file to the master GPS server is confirmed the GPS data file is deleted from the non-volatile memory database.

Updating the GPS receiver includes downloading an updates list from to the GPS receiver from the master GPS server and comparing a checksum of files contained in the updates list with system files contained on the GPS receiver. The files contained in the updates list are then copied over the system files on the GPS receiver. In addition, a known access points file on the GPS receiver is compared to a master version known access points file on the master GPS server. The master version known access points file is downloaded from the master GPS server to the GPS receiver. The data in the known access points file is replaced with the data in the master version known access points file.

The scanning and connecting steps may include detecting WLAN access points in range of the GPS receiver and generating a list of WLAN access points in range. The list of WLAN access points in range is sorted based upon a known access points file, a blacklist access points file, signal strength, and/or security. The GPS receiver then attempts to connect to a selected WLAN access point on the sorted list;

the attempt being repeated with another WLAN access point on the sorted list until a connection is established. The movement speed of the GPS receiver is checked to determine if it exceeds twenty-five miles per hour. If the movement speed exceeds twenty-five miles per hour, the detecting, generating and sorting steps are repeated.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

The present invention is directed to a method or system of searching for and connecting to a series of wireless local area networks on a mobile device while moving. Once a device is connected to a network, the devices uses the series of wireless networks to send and receive global positioning system (GPS) data, software, information and other data to/from a web service or application. Specifically, the present invention is concerned with using such wireless networks as opposed to cellular or satellite networks.

Figure 1:
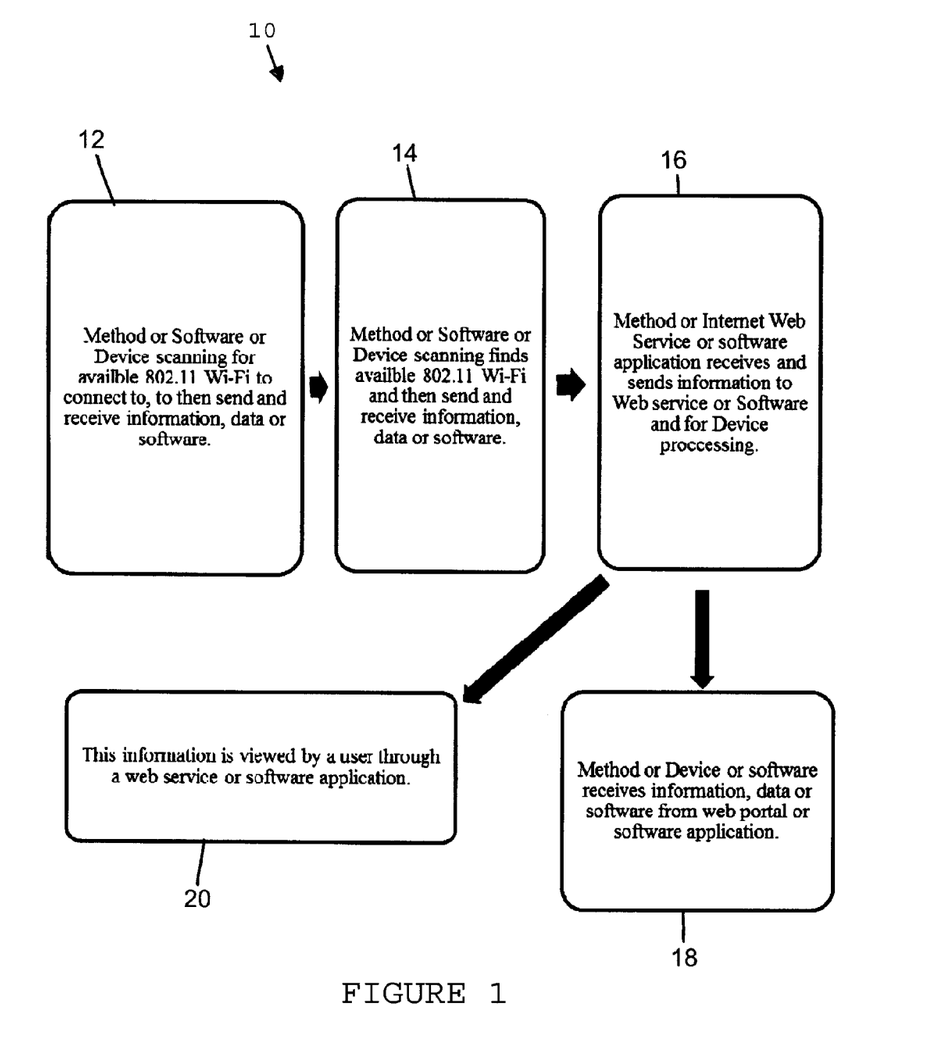
FIG. 1 is a flowchart illustrating a number of steps of the inventive method.

FIG. 1 illustrates the exemplary steps involved in the system or method of the present invention in a flow chart. The inventive method 10 begins with the step of scanning 12 for available Wi-Fi enabled, local area networks, such as 802.11 wireless networks, that are in range. The step of scanning 12 can be performed while an applicable mobile device is either stationary or moving. Once an available, in-range network is located the applicable device connects 14 to the network utilizing one of four processes, as described further below. When connected to the network, the mobile device transmits 16 data, software, and/or other information, particularly GPS data, to a web service or software application.

In turn, the mobile device may also receive 18 data, software, and/or other information, particularly GPS data, from the web service or software application. The data, software and/or other information is viewable 20 through the web service or software application, as through a web browser or graphical user interface (GUI).

The inventive method 10 searches for 12 and connects to 14 available Wi-Fi networks to then send 16 and/or receive 18 data, software, and/or other information, particularly GPS data, from a related web service or software application. The GPS data may include information such as, latitude and longitude, altitude, speed, direction, and any other data or software applications that may be applicable to GPS devices.

The step of searching 12, whether moving or stationary, searches for many types of available Wi-Fi networks over which to send and receive the relevant data or information. The types of available Wi-Fi networks include:
 (1) open, public Wi-Fi networks or hot spots;
 (2) password protected, public Wi-Fi networks or hot spots;
 (3) password protected, private Wi-Fi networks or hot spots; and
 (4) private user Wi-Fi networks or hot spots with or without password protection.

The above examples of Wi-Fi networks or hot spots may be generated from wireless routers, enabled hot spot devices, enabled smart phones, or similar devices.

A GPS collector process initializes a GPS service on the device, collects GPS records and updates those records in regular intervals—preferably five minutes. For a moving device, the records are stored in a GPS database typically maintained in volatile memory, i.e., RAM. The process measures the speed component of the velocity to determine if it is slower or faster than a predetermined threshold, i.e., 5 miles per hour. While the speed is greater than the predetermined threshold, the GPS collector process maintains the GPS records in volatile memory. For a speed that previously exceeded the predetermined threshold, the GPS collector process copies the GPS records to non-volatile memory, i.e., flash memory, once the speed is below the predetermined threshold, including a full stop. This is done to minimize the number of write cycles to the non-volatile memory to extend the life of the memory device. The process is preferably configured to average the speed from a recent set of data records, i.e., the last three records, to determine whether the speed if greater than or less than the predetermined threshold.

When writing the records to non-volatile memory, the process also starts a Link Handler process to begin connection attempts to another Wi-Fi network access point or hot spot. The GPS collector process preferably stores the maximum speed attained since the last stop so that the Link Handler process can use vehicle speed in its connection algorithm as described below. The GPS collector process determines based on speed analysis of the GPS records discussed above when to start the connect process for another Wi-Fi network access point or hot spot.

Once the inventive method is initiated, i.e., identifying and connecting to an available Wi-Fi network access point or hot spot, it generates a list of the best Wi-Fi network candidates based upon signal strength and type of security. There are two main areas of the inventive method that perform these processes.

The Link Handler process is started by the GPS Collector process based upon speed and movement characteristics. The Link Handler process is started in response to the saving of the GPS records to the non-volatile memory. The Link Handler process detects available Wi-Fi network access points and ranks them based upon the following factors: (1) known access point (see discussion below); (2) signal strength; (3) status (i.e., open or private); and (4) security (i.e., password or no password). The Link Handler process then attempts to connect to the first ranked access point. If the attempted connection is successful, the Link Handler process is completed until the next time it is activated, i.e., the device is moving out of range of the current access point.

If the attempted connection is not successful, the Link Handler process re-tries the attempted connection to the first ranked access point. If after a reasonable number of re-tries, i.e., three more attempts, the Link Handler process cannot connect to the first ranked access point, the first ranked access point is added to a Do Not Attempt List that contains information about Wi-Fi network access points that are detectable but not connectable. If a connection to an access point has not been completed, the process is repeated with the next ranked access point until a connection is made.

As successful connections to access points are made, the connected access point is added to a Known Access Points List, which list may be used in the future ranking of detected access points. The Link Handler process does not attempt to connect to access points on the Do Not Attempt List as it was determined that a connection will not work and attempts to connect would likely fail. If a user knows the password or security credentials for a particular access point, the user may access a web portal or software application to add the access point and password or security credential to the Known Access Points list, which is downloaded to the GPS device by the Link Handler process. If the user later acquires the password or security credentials for an access point on the Do Not Attempt List, the user can move the access point to the Known Access Points List with the appropriate password or security credentials. The Known Access Points List and Do Not Attempt List are preferably both stored in non-volatile memory on the device so that the information is always available to a user.

If a non-volatile memory file of GPS records exists, an upload file of new GPS records that includes a summary of GPS records activity is created. The Link Handler process then uploads the file of new GPS records from the web service or application software to a master GPS server if the connection to the access point still exists. Once the GPS records are uploaded to the master GPS server, the data file is deleted from the non-volatile memory. If the Link Handler process is unable to upload the GPS records, the file in non-volatile memory is maintained and additional GPS records may be added when the device comes to another stop or below the predetermined threshold speed. The Link Handler preferably uploads the data file at its earliest opportunity to create a connection to an access point and maintain that connection.

The Link Handler also downloads any data, software or other information from the master GPS server to the web service or application software. If the connection to the access point does not still exist, then the GPS Collector process engages a critical Process Lock on the system. The Process Lock provides either the GPS Collector process or the Link Handler process exclusive access to the file system to prevent accidental data loss. The Process Lock is engaged at critical times. For the GPS Collector process, the Process Lock is engaged when the speed exceeded the predetermined threshold and now is below the predetermined threshold. The Process Lock will also engage in favor of the GPS Collector process if GPS reception is lost or stopped for more than thirty minutes. For the Link Handler process, the Process Lock will engage if the speed is below the predetermined threshold and there are saved GPS records to upload to the main server. The Process Lock will also engage in favor of the Link Handler process if the GPS records were successfully uploaded to the main server so that the saved GPS records can be deleted from the non-volatile memory.

The Link Handler process begins the above described process of connecting to another Wi-Fi network access point. The Link Handler process accounts for velocity characteristics, i.e., speed and direction, of the mobile device and starts the process of connecting to a Wi-Fi network access point as described above. The list of detected access points in range is generated and sorted based upon (1) known access point (see discussion below); (2) signal strength; (3) status (i.e., open or private); and (4) security (i.e., password or no password) and the Link Handler process goes through sorted list trying to connect to best candidates first if the speed is less than a target threshold, i.e., 25 MPH. If speed is greater than the target threshold, i.e., 25 MPH, the Link Handler process makes a new list and attempts to connect—repeating the process until the speed is less than the target threshold.

Figure 2:
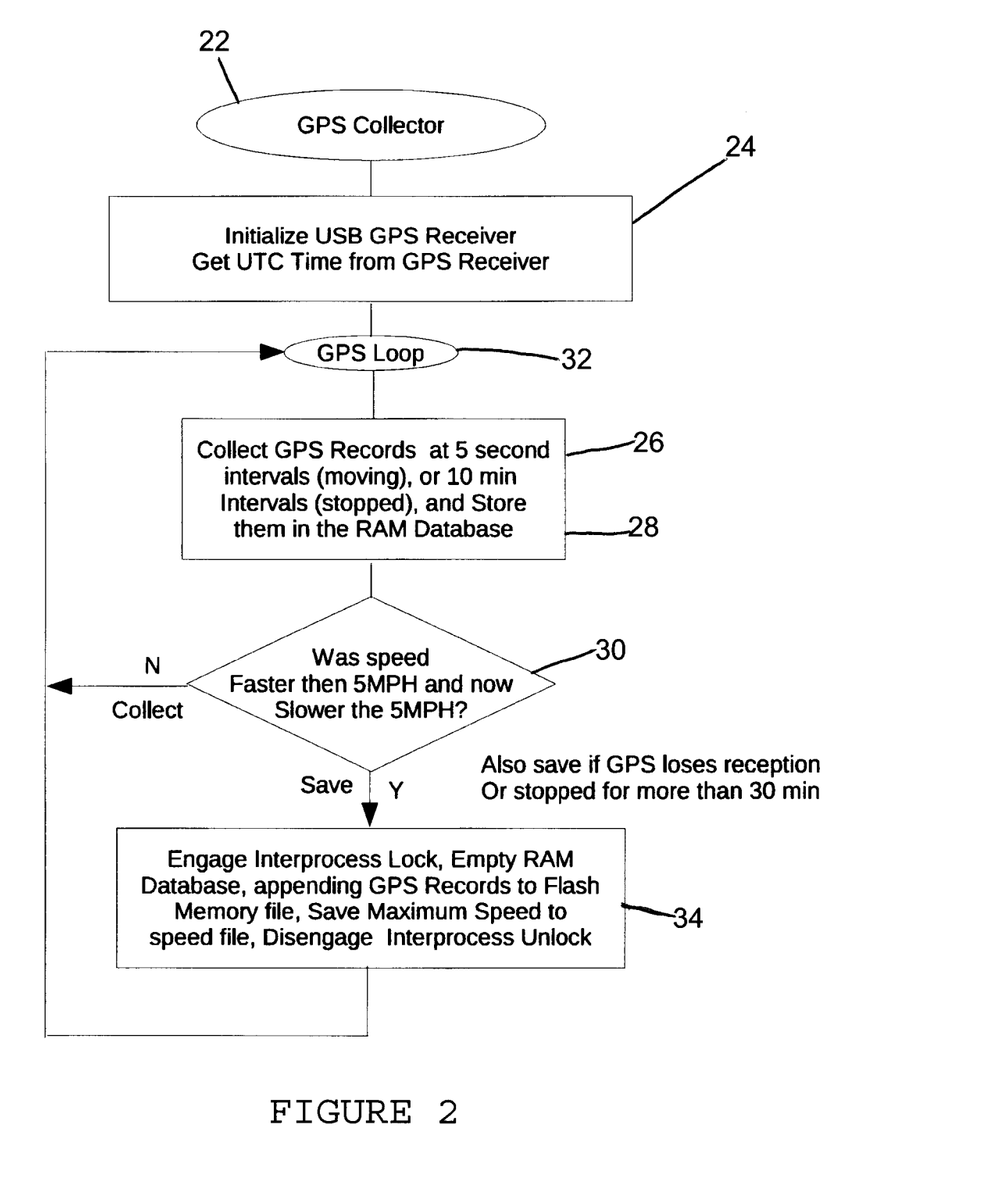
FIG. 2 is a flowchart illustrating a preferred embodiment of the steps employed in the GPS Collector process.

FIG. 2 illustrates the steps of a particularly preferred embodiment of the GPS Collector process 22 in a flowchart. The GPS Collector process 22 begins with an initialization 24 of the GPS receiver and the acquisition of a standard time record, i.e., UTC time. The GPS receiver collects 26 GPS records at five second intervals while moving and ten minute intervals while stopped. The GPS receiver also stores the GPS records in a RAM or volatile memory database 28. The process then performs a check 30 to determine if the speed of movement of the GPS receive was faster than five miles per hour and now slower than five miles per hour. This check 30 is performed in relation to the speed recorded in the GPS records since the last time the GPS records were transferred to non-volatile flash memory as described below. This check 30 will also be answered in the affirmative if the GPS receiver loses reception or is stationary for more than thirty minutes.

If the check 30 is answered in the negative, i.e., the speed was not faster than five miles per hour or was faster than five miles per hour but not yet below five miles per hour, then the collection and storing steps 26 and 28 are repeated from the GPS Loop point 32. If the check 30 is answered in the positive, i.e., the speed was faster than five miles per hour and now below five miles per hour or the GPS receiver lost reception or was stationary for more than thirty minutes, then the process 22 performs a file transfer process 34. The file transfer process 34 engages an interlock (or the Process Lock discussed above), appends the GPS records in the volatile memory to a file in non-volatile flash memory, empties the volatile memory database, saves the maximum recorded speed to a speed file, and then disengages the interlock.

Figure 3:
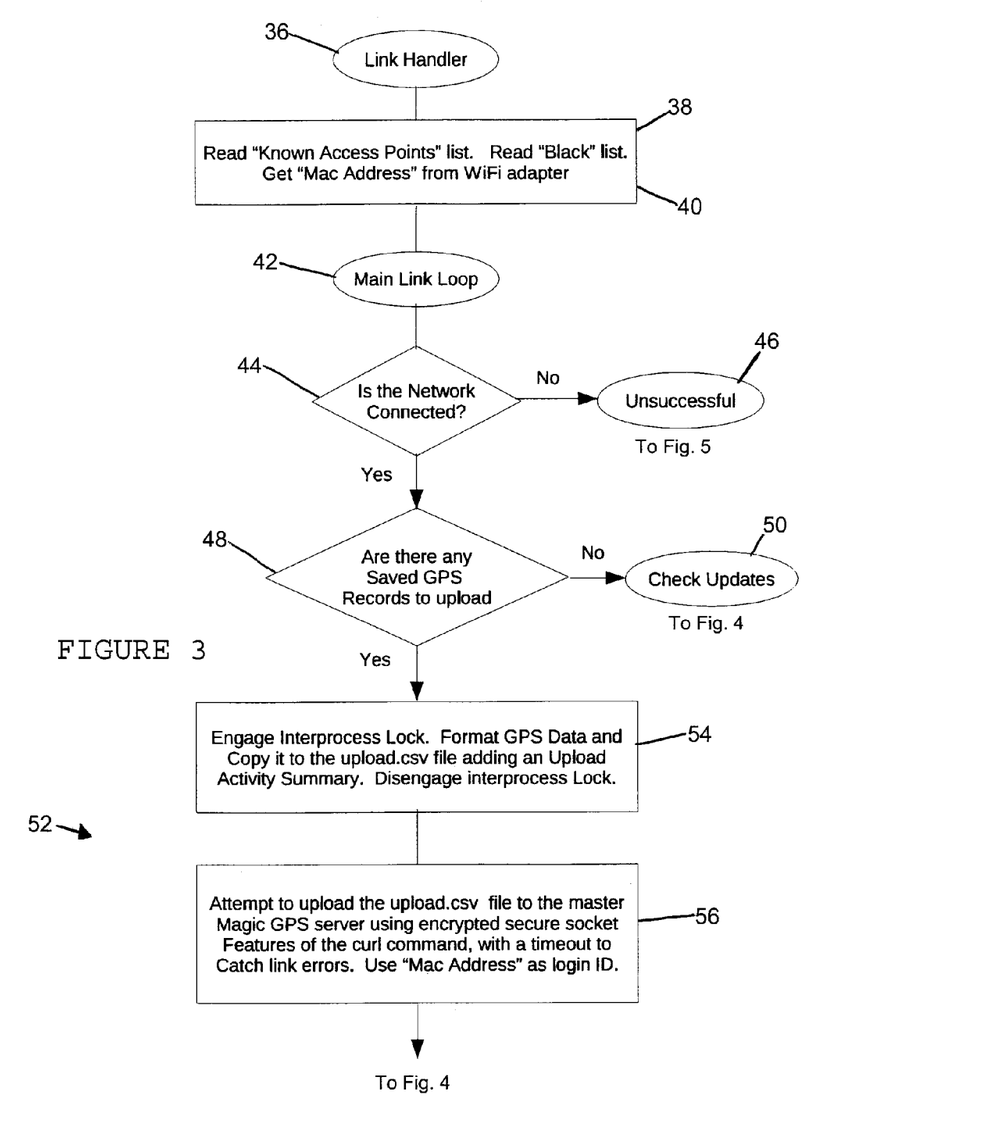
FIG. 3 is a flowchart illustrating a first part of a preferred embodiment of the steps employed in the Link Handler process.
Figure 4:
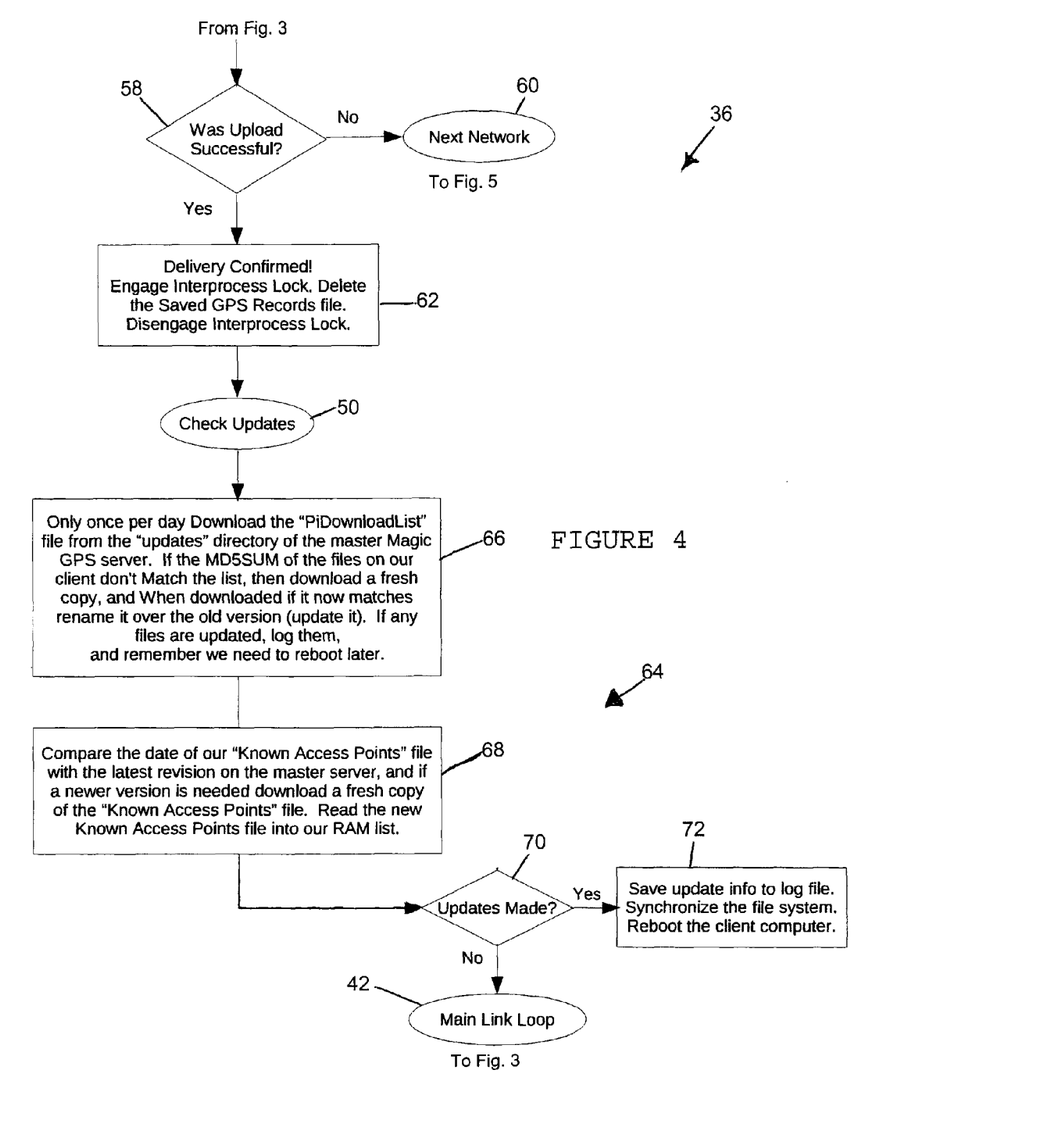
FIG. 4 is a flowchart illustrating a second part of a preferred embodiment of the steps employed in the Link Handler process.
Figure 5:
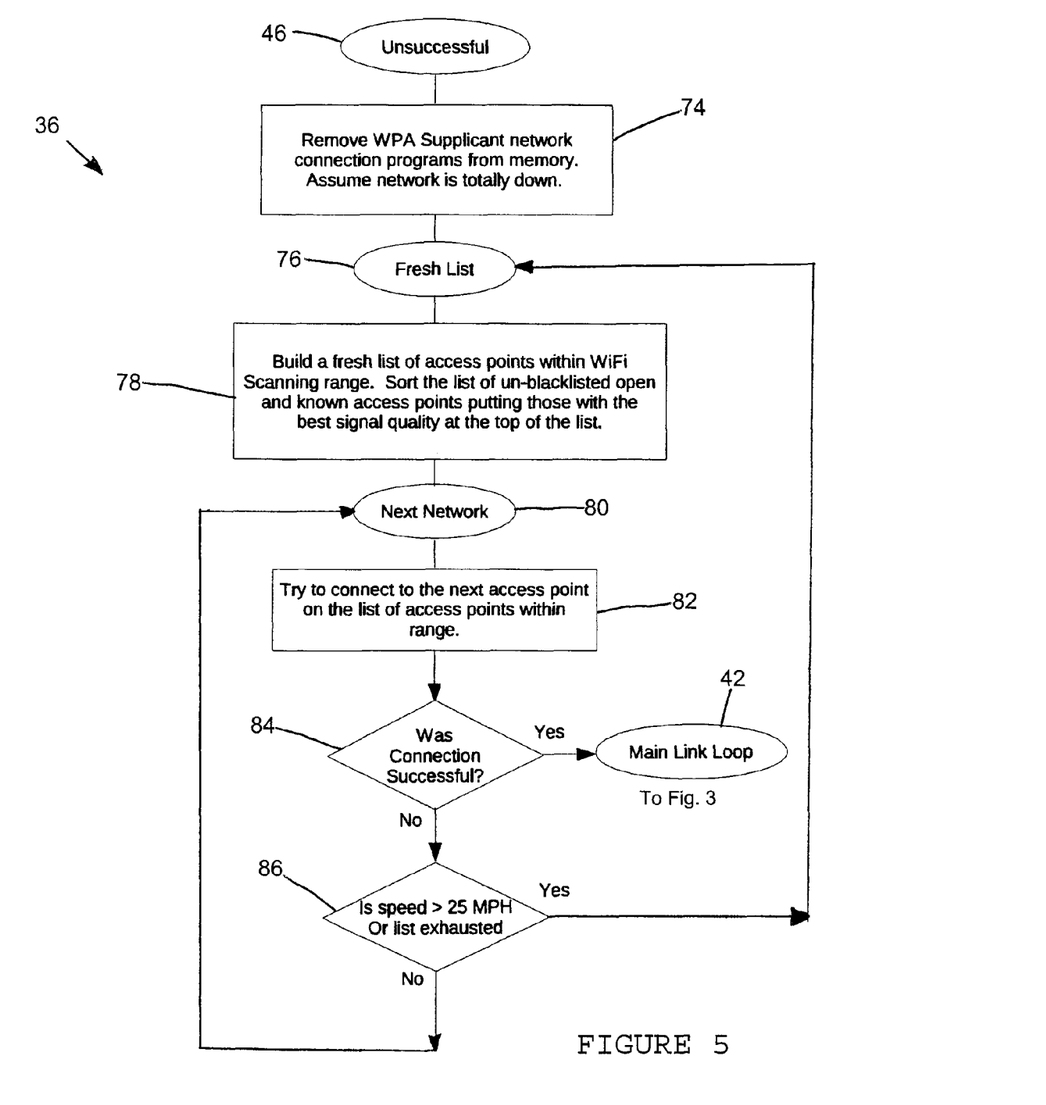
FIG. 5 is a flowchart illustrating a third part of a preferred embodiment of the steps employed in the Link Handler process.

FIGS. 3, 4 and 5 illustrate the steps of a particularly preferred embodiment of the Link Handler process 36 in a flowchart. In FIG. 3, the Link Handler process 36 begins with the step of reading 38 the Known Access Points list and the Do Not Attempt list. The process 36 also retrieves 40 a mac address from the Wi-Fi adapter contained in the GPS receiver. The process 36 then begins the Main Link Loop 42 where it detects a Wi-Fi connection and performs standard functions of the Link Handler process 36.

As part of the Main Link Loop 42, the process 36 checks for an existing network connection 44. If there is not an existing network connection ("No"), the process 36 is routed to an Unsuccessful Loop 46, which is discussed in more detail below under FIG. 5. If there is an existing network connection ("Yes"), the process 36 continues in this Main Link Loop 42 to another check for whether there are any saved GPS records to upload 48. These GPS records may be in either volatile or non-volatile memory. If there are no saved GPS records to upload ("No"), the process 36 is routed to a Check Updates Loop 50, which is discussed in more detail below under FIG. 4. If there are saved GPS records to upload ("Yes"), the process 36 performs a file upload process 52. The file upload process 52 begins with the step of preparing 54 the file for upload. The step of preparing 54 includes engaging an interlock. Next the GPS records and data if formatted and copied to a data file, i.e., "upload.csv", including an upload activity summary. The interlock is then disengaged.

After the preparing step 54, the process 52 then attempts to upload 56 the data file to a master GPS server, preferably using encrypted secure socket features as in the curl command. A timeout process is used to catch any link errors. The mac address acquired from the Wi-Fi adapter is used as the login ID for the master GPS server to ensure that the data file is attributed to the correct GPS receiver. The process 36 then moves to FIG. 4.

In FIG. 4, the process 36 checks whether the upload 56 was successful 58. If the upload was not successful ("No"), the process 36 is routed to the Next Network Loop 60, which is discussed in more detail below under FIG. 5. If the upload was successful ("Yes"), the process 36 continues to a delete step 62, wherein upload is confirmed, interlock is engaged, the GPS records data file is deleted from the GPS receiver, and the interlock is disengaged.

Following confirmed upload, the Check Updates Loop 50 begins. This Check Updates Loop 50 is the point in the process where the check for saved GPS records 48 from FIG. 3 resulted in a negative answer. The next steps involve an update process 64. The update process 64 begins with downloading a "PiDownloadList" file from an updates directory on the Master GPS server 66. This "PiDownloadList" file contains a list of files and a list of checksums or MD5 hashes for those files. The list of files and checksums is compared to files existing on the GPS receiver client. If the list and checksums do not match the files on the client, this means that the files have been updated since the last install to the client and the files on the GPS receiver client need to be updated. A current version of the files is downloaded from the master GPS server and a new checksum is run. If the checksum matches the "PiDownloadList", the new files are written over the old files on the client. Any updated files are logged and a reboot is scheduled for later.

The next step involves comparing 68 the date of the Known Access Points file on the client with the latest version on the master GPS server. If a newer version of the Known Access Points file is needed on the client, it is downloaded and installed into the client memory database. The process then checks to see if updates were made 70. If updates were made ("Yes"), the update information is saved to a log file, the file system is synchronized, and the GPS receiver client is rebooted 72. This ends the process and either the GPS Collector process 22 or the Link Handler process 36 will resume from the beginning once the GPS receiver client has booted up. If updates were not made ("No"), the process is routed back to the Main Link Loop 42 under FIG. 3.

FIG. 5 illustrates several process loops in the Link Handler process 36. The first is the Unsuccessful Loop 46, where the process is routed when the GPS receiver client is not connected to a network as shown in FIG. 3. In this Loop 46, the WPA supplicant network connection programs are removed from memory on the client 74. The process assumes that the network is totally down or unavailable. Next is the Fresh List Loop 76, wherein a fresh list of available Wi-Fi access points is generated 78. This generation step follows the criteria described above regarding the known access points list, the do not attempt list, signal strength, public/private, and password/no password, among others.

Next begins the Next Network Loop 80, wherein the GPS receiver client attempts to connect 82 to one of the access points on the list just generated 78. A check of whether the connection attempt was successful 84. If "Yes", the process is routed back to the Main Loop Link 42 in FIG. 3. If "No", the process performs another check to determine whether the speed currently exceeds twenty-five miles per hour or the list of access points has been exhausted 86. If the check 86 is answered "Yes", the process is routed back to the Fresh List 76 for the generation of a new list. If the speed exceeds twenty-five miles an hour, it is assumed that the client will be out of range of all access points on the then existing list and new list would need to be generated. If the check 86 is answered "No", the process is routed back to the Next Network Loop 80 to attempt to connect to the next access point on the list. This Loop 80 assumes that the client is still in range of the access points on the list.

Unless the interlock is engaged, the GPS Collector process 22 and the Link Handler process 36 operate in parallel. The GPS Collector process 22 collects GPS records in the prescribed intervals as long as the interlock is not engaged in favor of the Link Handler process 36. Similarly, the Link Handler process 36 checks for existing network connections and attempts to connected to additional access points as long as the interlock is not engaged in favor of the GPS Collector process 22.

Although various embodiments have been described in detail for purposes of illustration, various modifications may be made without departing from the scope and spirit of the invention.

What is claimed is:

1. A process for detecting and connecting to wireless local area networks (WLANs) to exchange global positioning system (GPS) data and information between a GPS receiver having a wireless network adapter and a master GPS server, comprising the steps of:
   detecting whether the GPS receiver is in motion or stationary;
   collecting GPS records about the current location and movement speed data using the GPS receiver in five second intervals if the GPS receiver is in motion and in ten minute intervals if the GPS receiver is stationary;
   storing the collected GPS records and movement speed data in a volatile memory database contained in the GPS receiver;
   scanning for available WLANs within range of the GPS receiver;
   detecting available WLAN access points in range of the GPS receiver;
   generating a list of WLAN access points in range;
   sorting the list of WLAN access points in range based upon a known access points file, a blacklist access points file, signal strength, or security of the WLAN access points;
   attempting to connect to a selected WLAN access point on the sorted list;
   repeating the attempting to connect step with another WLAN access point on the sorted list until a connection is established;
   connecting the GPS receiver to a selected WLAN through the selected WLAN access point;
   sending the GPS records from the GPS receiver to the master GPS network over the selected WLAN; and
   receiving information or software to the GPS receiver from the master GPS network over the selected WLAN.

2. The process of claim 1, further comprising the steps of:
   checking whether a movement speed of the GPS receiver previously exceeded five miles per hour and is presently less than five miles per hour; and
   saving collected GPS records if the movement speed is presently less than five miles per hour; the GPS receiver loses connection with the selected WLAN, or the GPS receiver is stationary for more than thirty minutes.

3. The process of claim 1, further comprising the steps of:
   engaging a GPS process interlock;
   appending the collected GPS records to a GPS data file maintained on a non-volatile memory database;
   saving the movement speed data to a speed data file maintained on the non-volatile memory database; and
   disengaging the GPS process interlock.

4. The process of claim 3, further comprising the steps of:
engaging a Link Handler process interlock;
copying the GPS data file to an Upload file;
disengaging the Link Handler process interlock;
uploading the Upload file to the master GPS server over the selected WLAN;
confirming delivery of the Upload file to the master GPS server; and
deleting the GPS data file from the non-volatile memory database.

5. The process of claim 1, further comprising the steps of:
downloading an updates list from to the GPS receiver from the master GPS server;
comparing a checksum of files contained in the updates list with system files contained on the GPS receiver; and
copying the files contained in the updates list over the system files on the GPS receiver.

6. The process of claim 5, further comprising the steps of:
comparing a known access points file on the GPS receiver to a master version known access points file on the master GPS server;
downloading the master version known access points file from the master GPS server to the GPS receiver; and
replacing the data in the known access points file with the data in the master version known access points file.

7. The process of claim 1, further comprising the steps of:
checking whether the movement speed of the GPS receiver exceeds twenty-five miles per hour; and
repeating the detecting, generating and sorting steps if the movement speed exceeds twenty-five miles per hour.

8. A process for detecting and connecting to wireless local area networks (WLANs) to exchange global positioning system (GPS) data and information between a GPS receiver having a wireless network adapter and a master GPS server, comprising the steps of:
detecting whether the GPS receiver is in motion or stationary;
collecting GPS records about the current location and movement speed data using the GPS receiver in five second intervals if the GPS receiver is in motion and in ten minute intervals if the GPS receiver is stationary;
storing the collected GPS records and movement speed data in a volatile memory database contained in the GPS receiver;
comparing a known access points file on the GPS receiver to a master version known access points file on the master GPS server;
downloading the master version known access points file from the master GPS server to the GPS receiver;
replacing the data in the known access points file with the data in the master version known access points file;
scanning for available WLANs within range of the GPS receiver;
detecting available WLAN access points in range of the GPS receiver;
generating a list of WLAN access points in range;
sorting the list of WLAN access points in range based upon the known access points file, a blacklist access points file, signal strength, or security of the WLAN access points;
checking whether the movement speed of the GPS receiver exceeds twenty-five miles per hour;
repeating the detecting, generating and sorting steps if the movement speed exceeds twenty-five miles per hour;
attempting to connect to a selected WLAN access point on the sorted list;
repeating the attempting to connect step with another WLAN access point on the sorted list until a connection is established;
connecting the GPS receiver to a selected WLAN through the selected WLAN access point;
sending the GPS records from the GPS receiver to the master GPS network over the selected WLAN; and
receiving information or software to the GPS receiver from the master GPS network over the selected WLAN.

9. The process of claim 8, further comprising the steps of:
checking whether a movement speed of the GPS receiver previously exceeded five miles per hour and is presently less than five miles per hour;
saving collected GPS records if the movement speed is presently less than five miles per hour; the GPS receiver loses connection with the selected WLAN, or the GPS receiver is stationary for more than thirty minutes;
engaging a GPS process interlock;
appending the collected GPS records to a GPS data file maintained on a non-volatile memory database;
saving the movement speed data to a speed data file maintained on the non-volatile memory database; and
disengaging the GPS process interlock.

10. The process of claim 9, further comprising the steps of:
engaging a Link Handler process interlock;
copying the GPS data file to an Upload file;
disengaging the Link Handler process interlock;
uploading the Upload file to the master GPS server over the selected WLAN;
confirming delivery of the Upload file to the master GPS server; and
deleting the GPS data file from the non-volatile memory database.

11. The process of claim 8, further comprising the steps of:
downloading an updates list from to the GPS receiver from the master GPS server;
comparing a checksum of files contained in the updates list with system files contained on the GPS receiver; and
copying the files contained in the updates list over the system files on the GPS receiver.

* * * * *